(12) United States Patent
Grinwald et al.

(10) Patent No.: US 8,927,635 B2
(45) Date of Patent: Jan. 6, 2015

(54) POSITIVELY CHARGED INK COMPOSITION

(75) Inventors: Yaron Grinwald, Melter (IL); Gil Bar-Haim, Holon NA (IL); Yigal Berson, Lod (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 244 days.

(21) Appl. No.: 13/574,471

(22) PCT Filed: Mar. 9, 2010

(86) PCT No.: PCT/EP2010/052988
§ 371 (c)(1),
(2), (4) Date: Jul. 20, 2012

(87) PCT Pub. No.: WO2011/110221
PCT Pub. Date: Sep. 15, 2011

(65) Prior Publication Data
US 2012/0287180 A1  Nov. 15, 2012

(51) Int. Cl.
| | |
|---|---|
| C08K 5/00 | (2006.01) |
| H01B 1/00 | (2006.01) |
| C09D 11/322 | (2014.01) |
| C09D 11/033 | (2014.01) |
| C09D 11/106 | (2014.01) |
| C09D 11/36 | (2014.01) |
| C09D 11/38 | (2014.01) |
| G02F 1/167 | (2006.01) |

(52) U.S. Cl.
CPC ............ *C09D 11/322* (2013.01); *C09D 11/033* (2013.01); *C09D 11/106* (2013.01); *C09D 11/36* (2013.01); *C09D 11/38* (2013.01); *G02F 2001/1678* (2013.01)
USPC .......................................... 524/284; 252/500

(58) Field of Classification Search
USPC ........................................................ 524/284
See application file for complete search history.

(56) References Cited

U.S. PATENT DOCUMENTS

| | | | | |
|---|---|---|---|---|
| 6,002,893 | A * | 12/1999 | Caruthers et al. ............... | 399/54 |
| 6,113,810 | A | 9/2000 | Hou et al. | |
| 2002/0060321 | A1* | 5/2002 | Kazlas et al. ................... | 257/66 |
| 2011/0266347 | A1* | 11/2011 | Grinwald et al. ............. | 235/451 |

FOREIGN PATENT DOCUMENTS

| | | |
|---|---|---|
| EP | 1661958 | 5/2006 |
| EP | 1674536 | 6/2006 |
| KR | 20020010829 | 6/2002 |

\* cited by examiner

*Primary Examiner* — Hui Chin
(74) *Attorney, Agent, or Firm* — Hewlett-Packard Patent Department; Sandra Beccarelli

(57) ABSTRACT

Positively charged ink compositions, its use and method of making the same are disclosed. A disclosed example of the positively charged ink compositions includes a combination of a carrier liquid, basic pigment-loaded resin particles, a charge director and an acidic charge adjuvant.

14 Claims, 4 Drawing Sheets

POSITIVELY CHARGED INK COMPOSITION

BACKGROUND

Ink compositions containing charged particles are used in a wide variety of applications such as electro-conductive additives to plastics, toners in electrophotography printing, pigmented ink, electrophoretic display as well as many other applications. Such inks are often referred to as electronic inks. Such electronic inks traditionally include charged particles, such as colorant particles, in order to help the particles to respond to electric field.

Currently, charged particles that are used in electronic ink materials or in electrophoretic display materials, as examples, are mostly negatively charged. This unidirectional charging mechanism often limits the design of devices. Indeed, as an example, when particles are pigments, the negative charge limits device architecture to have stacked layers in order to accommodate multiple colors. As an example, such architecture often results in that most of the light incident to the display is scattered by the top layers and, therefore, insufficient light reaches the bottom layer which lead thus to performance issues such as low optical density.

Many methods have been proposed to produce such positively charged inks. However, investigations continue into developing positively charged inks.

BRIEF DESCRIPTION OF THE DRAWINGS

Exemplary embodiments are described below with reference to the attached figures, which show experimental results that illustrate the effect of exemplary embodiments of the disclosure.

DETAILED DESCRIPTION

Figure 1:
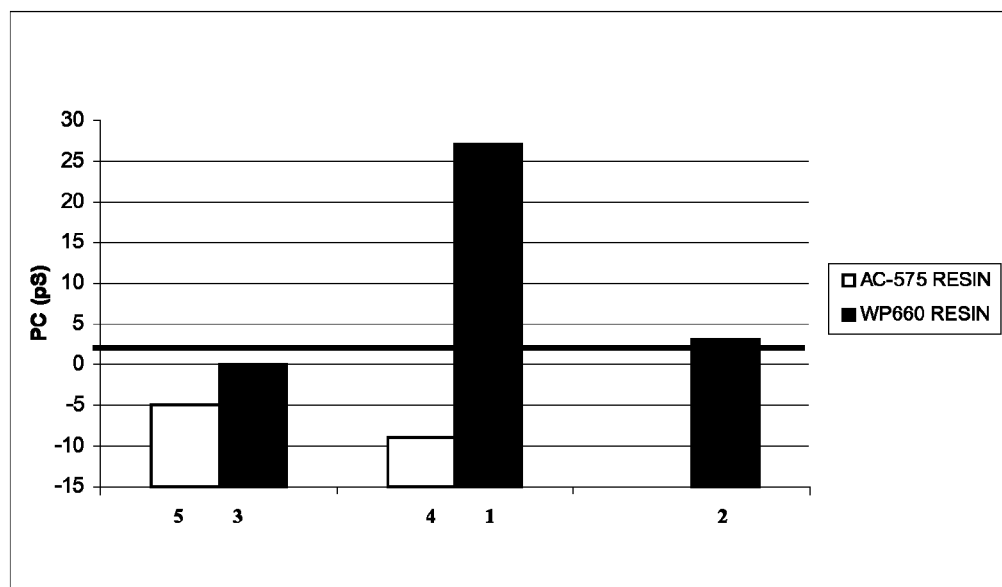
FIGS. 1 and 2 are comparative graphs representing measured particle conductivities of example ink compositions, in relation with resins and charge adjuvant natures.

Embodiments of the present disclosure will employ, unless otherwise indicated, techniques of synthetic organic chemistry, ink chemistry, electrochemistry, chemistry of conducting compounds, media chemistry, printing chemistry, and the like, that are within the skill of the art. Such techniques are explained fully in the literature. The following examples are put forth to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, temperature is in ° C., and pressure is at or near atmospheric. Standard temperature and pressure are defined as 20° C. and 1 atmosphere. Unless otherwise indicated, the viscosity is measured at a shear rate of 11 l/sec, is expressed in cps, and is measured at a temperature of 25° C.

Before embodiments of the present disclosure are described in detail, it is to be understood that, unless otherwise indicated, the present disclosure is not limited to particular materials, and processes disclosed herein. It is also to be understood that the terminology used herein is for purposes of describing particular embodiments only, and is not intended to be limiting, as the scope of the present invention will be defined only by the claims and equivalents thereof. In the present specification, and in the claims, the following terminology will be used: the singular forms "a", "an" and "the" include plural referents unless the context clearly dictates otherwise. Thus, for example, reference to "a support" includes a plurality of supports. The terms "about" and "approximately," when referring to a numerical value or range is intended to encompass the values resulting from experimental error that can occur when taking measurements. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 weight percentage (wt %) to about 20 weight percentage (wt %) should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 15 wt %, 10 wt % to 20 wt %, etc.

In some embodiments, the present disclosure refers to an ink which is positively charged and which contains a carrier liquid, basic pigment-loaded resin particles, a charge director and an acidic charge adjuvant. As an example, the ink is an electronic ink. As electronic ink, it is meant herein a low dielectric fluid that contains charged particles such as, for example, a colorant or a pigment encapsulated by a polymer capable of adsorbing a charge. Such particles are in suspension in a liquid carrier. Some electronic inks may be referred to as electrophoretic or low dielectric inks where the charged particles may be moved with a Coulombic force exerted on the particles by an applied electrical signal.

In some embodiments, the present disclosure refers to method for making such ink. In some other embodiments, the present disclosure refers to uses of this ink in electronic display. In some embodiments, the present disclosure refers to electronic display containing such ink.

In some examples, it has likewise been observed that acidic charge adjuvant, when added to positively charged ink composition, improves effectiveness of a charge director containing such ink composition.

The inks disclosed herein are suitable for use in a variety of applications, including display applications, electronic skins, blanket jetting applications, digital printing applications, ion beam printing applications, or other printing applications.

In some embodiments, the electronic ink of the present disclosure includes basic, pigment-loaded, resin particles. As "pigment-loaded resin particle", it is meant herein particle including at least a pigment and a resin polymer, the pigment being embedded in a resin polymer. In some examples, the ink includes a basic resin. As examples, the resin may be a thermoplastic resin exhibiting a melting point of greater than 50°

C., including greater than 90° C. As another example, the resin may be a basic wax resin. As "basic", it is meant herein that the resin has the capacity of attracting protons (H$^+$).

In some embodiments, the resin includes polymers such as polyamines, polyamides, and potentially others polymers. In some examples, the resin is a homopolymer or a copolymer of polyvinyl pyrrolidone. In some other examples, the resin is a copolymer of polyvinyl pyrrolidone. Examples of monomers polymerized with vinyl pyrrolidone in order to form the polyvinyl pyrrolidone copolymers include, but are not limited to, alkylmethacrylates-acrylates such as butylmethacrylates, methylmethacrylates and the like. Illustrative examples of polyvinyl pyrrolidones polymers include, for example, styrene/butylmethacrylate/vinyl pyrrolidone terpolymers, vinyl pyrrolidone/vinyl acetate copolymers, vinyl pyrrolidone homopolymers, and the like. In some other embodiments, the resin is a vinyl pyrrolidone/triacontene copolymer (a copolymer of vinylpyrrolidone grafted with triacontene). In some more specific embodiments, the resin is 2-pyrrolidinone 1-ethenyl triacontene polymer.

In some examples, the resin is a polyvinyl pyridine polymer or copolymer such as polyvinyl pyridine co-styrene or polyvinyl pyridine co-butyl methacrylate. In some other embodiments, the resin is an amino terminated polyacrylates such as poly(t-butyl amino ethyl methacrylate) or poly(dimethyl amino ethyl methacrylate). In some other examples, the resin is a polymer or copolymer selected from the group consisting of polyethylene imine; polyethylene oxide diamine terminated; polypropylene oxide, monoamine or di-amine terminated; polyamide; polydimethyl siloxane diamino propyl terminated; ethylene/butylene copolymer mono and dihydroxy terminated; hydroxyl ethyl cellulose.

Exemplary embodiments of the resin of the present disclosure include Antaron®WP-660 wax resin, a copolymer available from International Specialty Products and Alcyn®575 wax resin, a copolymer available from Honeywell Inc.

In some examples, the basic resin may exhibit a molecular weight ranging from 500 to 20,000. In other examples, the basic resin has a molecular weight ranging from 1,000 to 5,000; in yet other examples, the basic resin has a molecular weight ranging from 3,000 to 4,500.

As an example, in the ink composition, the resins are in the form of particles. In some embodiments, the resin particles include pigments that are loaded on the resin particles. In some other embodiments, the pigment-loaded resin particles exhibit an average particle size of less than 3.0 micron. In yet some other embodiments, the pigment-loaded resin particles exhibit an average particle size of less than 2.0 micron; and in yet some other embodiments, the pigment-loaded resin particles exhibit an average particle size if less than 1.0 micron. In some examples, the pigment-loaded resin particles exhibit an average particle of size less than 1.0 micron and contain a resin that exhibits a molecular weight of 500 to 20,000.

In some examples, the pigment loading may represent from about 1 to about 99 weight percent (wt %) of the total amount of solids present in the ink composition, i.e. wt % of total weight of non volatile substances; in some other examples, the pigment loading may represent from about 10 to about 90 wt %, or even from about 20 to about 75 wt % of the total amount of solids present in the ink composition. In yet other embodiments, the pigment represent from about 30 wt % to about 65 wt % of total weight of non volatile substances present in the ink composition.

Illustrative examples of potentially suitable pigments are Cabot Mogul L® (black), Monastral Blue G® (C.I. Pigment Blue 15 C.I. No. 74160), Quindo® Magenta (Pigment Red 122), Indo® Brilliant Scarlet Toner (Pigment Red 123, C.I. No. 71145), Dalamar® Yellow (Pigment Yellow 74, C.I. No. 11741), blue pigment BT-383D (DuPont), yellow pigment YT-717D (DuPont), red pigment RT-455D (DuPont) and blue pigment Helioecht® Blue GO (Bayer). Another illustrative example of the pigment includes Paliotol® yellow D1155 available from BASF.

In some examples, the resins involves the property of being compatible with a cyan pigment, a magenta pigment, a yellow pigment, a black pigment, and combinations thereof. Such compatibility allows development of CMYK color systems derivable from the same resin/charge director composition. In addition, such compatibility allows tuning or adjustment of the color gamut since the resin exhibits compatibility with combinations of pigments. Individual particles may include more than one of the CMYK pigments and/or other base or secondary pigments and may exhibit any color from various pigment combinations, such as, any color within the available Pantone spot color space. Thus, in some embodiments, the pigments are cyan pigments, magenta pigments, yellow pigments, black pigments or any combinations thereof.

The combination of resin particles and pigments may be contrasted with particles produced from in situ encapsulation during polymerization or from other similar known techniques. In the combination, the starting materials include solid resin particles and pigments, and processing yields particles of the solid resin loaded with pigment. Known in situ particles result from polymerization of precursor chemicals in solution in conjunction with encapsulation of pigment also in solution. No combination of resin particles and pigment occurs during known in situ encapsulation since no resin particles exist in the precursor solution. Instead, the only combining that occurs involves polymerization precursors and pigment.

In some examples, the resin may represent from about 1 to about 99 weight percent (wt %) of the total amount of solids present in the ink composition, i.e. wt % of total weight of non volatile substances (NVS). In some other examples, resin may represent from about 25 to about 80 wt % of the total amount of solids present in the ink composition. In yet some other examples, resin may represent from about 35 to about 70 wt % of the total amount of solids present in the ink composition.

In some embodiments, the charge adjuvant is an acidic charge adjuvant. In some examples, the charge adjuvant may be chemically bond to the basic pigment-loaded resin particles. As used herein, the term "charge adjuvant" is used to designate an additive added to inks that allows the binding and/or activation of the charge control agent/charge director. Without being linked by any theory, it is believed that the acid charge adjuvant interferes with the basic resin and lead to obtain a higher positive particle conductivity of electrophoretic particles. As "acid", is it means herein a Lewis acid or an organo-Lewis acid.

In some embodiments, the charge adjuvant is a charge adjuvant having the formula $X_n(R^a)(R^b)$ or $X_n(R^a)(R^b)$(COOH) wherein X is F, Cl, Br, NO$_2$ or CN; $R^a$ is a substituted or unsubstituted alkyl group; $R^b$ is Sb, P, Ti, Sn, B, Al, Zn, a phenol or a benzene group and wherein n is 1, 2, 3, 4 or 5.

In some embodiments, the charge adjuvant is a charge adjuvant having the formula $X_n(R^a)(R^b)$(COOH) wherein X is F, Cl, Br, NO$_2$ or CN; $R^a$ is a substituted or unsubstituted alkyl group; $R^b$ is Sb, P, Ti, Sn, B, Al, Zn, a phenol or a benzene group and wherein n is 1, 2, 3, 4 or 5.

In some other embodiments, the charge adjuvant has the formula $X_n(R^a)(R^b)$(COOH), wherein X is Cl; $R^a$ is a substituted or unsubstituted alkyl group having from 3, 4 or 5 carbon atoms, $R^b$ is a benzene or a phenol group and n is 1 or 2. In some other embodiments, the charge adjuvant has the formula $X_n(R^a)(R^b)(COOH)$, wherein X is Cl; $R^a$ is an alkyl group having 5 carbon atoms; $R^b$ is a benzene group and n is 1. In some embodiments, the charge adjuvant has the formula $X_n(R^a)(R^b)(COOH)$, wherein X is Cl; $R^a$ is an alkyl group having 4 carbon atoms; $R^b$ is a phenol group and n is 2.

In some examples, R is an alkyl group. The term "alkyl" as used herein means a branched, unbranched or cyclic saturated hydrocarbon group, which typically, although not necessarily, contains from 1 to about 20 carbon atoms, or 1 to about 15 carbon atoms, or 1 to about 10 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. In some other embodiments, R is a lower alkyl group. The term "lower alkyl" means an alkyl group having from 1 to 8 carbon atoms. In some other example, R is a substituted alkyl group or a heteroalkyl alkyl group. As used herein, the term "substituted alkyl" means an alkyl substituted with one or more substituent groups. The term "heteroalkyl" means an alkyl in which at least one carbon atom is replaced with a heteroatom.

In some embodiments, the charge adjuvant is a chlorophenyl carboxylic acid. In some embodiments, the charge adjuvant is 2-(4-chlorophenyl)-3-methylbutyric acid or 4-(2,4-dichlorophenoxy)butyric acid. In some other embodiments, the charge adjuvant is 2-(4-chlorophenyl)-3-methylbutyric acid.

In some examples, the charge adjuvant represents from about 0.05 to about 8 weight percent (wt %) of the total amount of solids present in the ink composition, i.e. wt % of total weight of non volatile substances (NVS). In some other examples, the charge adjuvant may represent from about 0.125 to about 6 wt % of the total amount of solids present in the ink composition. In some other examples, the charge adjuvant is present in an amount representing from about 1 to about 5 wt % of the total amount of solids present in the ink composition. In yet some other examples, the charge adjuvant is present in an amount representing about 4 wt % of the total amount of solids present in the ink composition. In exemplary embodiments of the present disclosure, the charge adjuvant is 2-(4-chlorophenyl)-3-methylbutyric acid and is present in an amount representing from about 3 to about 5 weight percent of the total amount of solids present in the ink composition.

In some embodiments, the ink of the present disclosure includes charge directors. Charge directors refer herein to components that induce and/or increase charge on particles. In some examples, the charge director, or charge control agent or charging agent, is physically associated to resin particles. In some other examples, the charge director is a positive charging agent. In some other examples, the charge director is a positive charging agent having the form of a positive organic charged micelle when used in non-polar solvents, such as hydrocarbon solvents. By way of example, the charge director may form a micelle structure physically associated (by hydrophobic bonding), but not chemically associated, with resin particles to provide at least part of the particle charge. Hydrophobic bonding or, more appropriately, hydrophobic interaction represents a well-known phenomenon that occurs in micellular structures. In nonpolar solvents, hydrophilic heads of amphiphilic molecules orient the molecules to assemble the hydrophilic heads together inside the micelle with hydrophobic tails assembled outside at the micelle surface in what is called reverse micelle. Thus, without being linked by any theory, the charge director forms a micelle structure physically associated by hydrophobic bonding with the resin particles to provide at least part of the particle charge. In some examples, the charge director forms reverse micelle.

In some embodiments, the charge director is a positive charge director. The charge director gives thus positively charge to resin particles. In some examples, the charge director has thus the benefit of providing a positive charge to the resin particles, resulting thus in basic pigment-loaded resin particles which are positively charged. The charged particles will thus be switchable by an electric field. In addition, this positive charging system provides the possibility to charge any kind of color and/or many additives, with no regard to the kind of pigment or additives used.

In some embodiments, the charge director is an organic multi-valent metal salt. Said organic salt is dissolved in the liquid carrier and is soluble in the carrier liquid at room temperature.

Examples of charge directors include organic acid metal salts consisting of polyvalent metal ions and organic anions as the counterion. Non-limiting examples of suitable metal ions include Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), Ta(V), and Ti(IV). Non-limiting examples of suitable organic anions include carboxylates or sulfonates derived from aliphatic or aromatic carboxylic or sulfonic acids.

In some embodiments, charge directors may be selected from the group consisting of manganese naphthenate, manganese octoate, zirconium octoate and cobalt octoate, iron naphthenate, magnesium octoate, titanium(IV)2-ethyl-1,3 hexanedio late, titanium(IV)-2-ethylhexyloxide, zirconium (IV)-ter-butoxide, tantalum(V)-butoxide, poly-oxo-aluminum tristearate, zinc naphthenate, barium distearate and calcium stearate. In some other embodiments, the charge director is zirconium(IV) octoate or 2-ethyl hexanoate. In yet some other embodiments, the charge director is zirconium (IV) 2-ethyl hexanoate.

In some other embodiments, the charge director includes polyisobutylene succinimide polyamine polymers. An exemplary embodiment of such charge director includes OLOA®1200 (available from Chevron Oronite).

In some examples, the charge director is present in an amount representing from about 0.001 to about 5 weight percent (wt %) of the total amount of solids present in the ink composition, i.e. wt % of total weight of non volatile substances (NVS). In some other examples, the charge director is present in an amount representing from about 0.01 to about 0.5 wt % of the total amount of solids present in the ink composition.

In some embodiments, the positively charged ink includes a liquid carrier. In some examples, the liquid carrier is a nonpolar liquid carrier. As an example, the liquid carrier has a resistivity in excess of about 109 ohm-cm and a dielectric constant below about 3.0. In some embodiments, the liquid carriers are hydrocarbons. In some other embodiments, the liquid carriers are aliphatic hydrocarbons. In some other embodiments, the liquid carriers are isomerized aliphatic hydrocarbons. As examples, the liquid carrier can include, but is not limited to, hydrocarbons, halogenated hydrocarbons, cyclic hydrocarbons, functionalized hydrocarbons (where functionalized can include alcohols, acids, esters, ethers, sulfonic acids, sulfonic acid esters, and the like). The hydrocarbon can include, but is not limited to, an aliphatic hydrocarbon, an isomerized aliphatic hydrocarbon, branched chain aliphatic hydrocarbons, aromatic hydrocarbons, and combinations thereof. In some embodiments, the carrier liquids include, but are not limited to, aliphatic hydrocarbon, isoparaffinic compounds, paraffinic compounds, dearomatized hydrocarbon compounds, and the like.

As examples, the carrier liquids can include, but are not limited to, Isopar-G®, Isopar-H®, Isopar-L®, Isopar-M®, Isopar-K®, Isopar-V®, Norpar 12®, Norpar 13®, Norpar 15®, Exxol D40®, Exxol D80®, Exxol D100®, Exxol D130®, and Exxol D140® (available from Exxon corporation); Teclen N-16®, Teclen N-20®, Teclen N-22®, Nisseki Naphthesol L®, Nisseki Naphthesol M®, Nisseki Naphthesol H®, Solvent L®, Solvent M®, Solvent H®, Nisseki Isosol 300®, Nisseki Isosol 400®, AF-4®, AF-5®, AF-6® and AF-7® (available from Nippon Oil Corp.); IP Solvent 1620® and IP Solvent 2028® (available from Idemitsu Petrochemical Corp.); Amsco OMS® and Amsco 460® (available from American Mineral Spirits Corp.); and electron, positron, new II, PurogenHF® (100% synthetic terpenes) (available from Ecolink).

In some embodiments, the carrier liquids is present in an amount representing from about 15 to about 99 weight percent by total weight of the ink composition.

In some examples, the positively charged ink according to the present disclosure contains a resin that is a vinyl pyrrolidone/triacontene copolymer and contains, as charge adjuvant, 2-(4-chlorophenyl)-3-methylbutyric acid. In some other examples, the positively charged ink contains vinyl pyrrolidone/triacontene copolymer as resins, 2-(4-chlorophenyl)-3-methylbutyric acid as charge adjuvant and contains zirconium 2-ethyl hexanoate as charge director.

In some examples, the ink composition can contain other components, such as for example, dispersing agents. In some embodiments, the dispersing agents or other components represent from about 0.05 wt % to about 60 wt % of the total weight of non volatile substances. In other embodiments, the dispersing agents or other components represent from about 0.5 wt % to about 25 wt % of total weight of non volatile substances present in the ink composition.

The ink compositions are to be charged in accordance with embodiments of the present disclosure and may be prepared using any of various methods known in the art. Exemplary embodiments of method of making an positively charged ink, include: firstly, grinding a carrier liquid, a basic resin and a pigment, to form an ink slurry; then, mixing an acidic charge adjuvant and a charge director with the ink slurry after grinding; and, ultimately, forming the ink.

An exemplary method of making the positively charged ink according to the present disclosure includes: grinding a carrier liquid, a vinyl pyrrolidone/triacontene copolymer resin and a pigment, to form a slurry; mixing a charge adjuvant and a charge director with the slurry after grinding, wherein the charge adjuvant is 2-(4-chlorophenyl)-3-methylbutyric acid or 4-(2,4-dichlorophenoxy)butyric acid; and forming the ink.

In some example, when the charge adjuvant is not dissolved in the carrier liquid, the charge adjuvant is added during the gridding.

In some examples, the carrier liquid, the resin, and the pigment are mixed in a mixer (e.g., double planetary mixer and the like). Other components such as, but not limited to, charge adjuvants, organic/inorganic pigments, surface modifiers, and additives, can be added to the slurry at this stage and/or during the next stage. Next, the slurry is added to a grinder (e.g., an attritor, a disk mill, a sand mill, an impeller attrition mill, a vibro-energy mill, or the like), and ground for a period to form the ink composition.

In some other examples, the charge adjuvant can be added after the grinding of the components in the ink toner (e.g., the carrier liquid, the resin, and the like). Addition of the charge adjuvant after grinding allows the user to tune the electrical and physical characteristics of the ink composition. The characteristics that can be tuned include, but are not limited to, viscosity, low field conductivity, high field conductivity, dc conductivity, particle conductivity, total charge and mobility, and combinations thereof. For example, the viscosity of the ink can be chemically modified (e.g., decreased) by changing the amount of charge adjuvant homogeneously added to the ink composition. As mentioned above, the charge adjuvant can be added to the mixture prior to grinding or after grinding. In addition, the charge adjuvant can be added before, after, or at the same time as the charge director. More precisely, in an example, a basic resin polymer, such as, Antaron®WP-660 wax resin (available from International Specialty Products), is mixed with a carrier liquid, as for example Solvent L® (manufactured by Idemitsu Petrochemical Corp), at elevated temperature (e.g. 120° C. to 130° C.) to form a slurry of the carrier liquid and polymer toner particles plasticized with the carrier liquid. The slurry is allowed to cool while mixing and carrier liquid is generally added to dilute the slurry so that it includes, for example, between 10 to 23% by weight of solids. While cooling, the slurry is precipitated in a form of paste. Pigments are added to provide the particles with a desired color and the mixture is loaded into a ball mill and grounded, starting at a temperature of about 60° C. and being reduced to room temperature, generally for about 20 hours, until the toner particles have a desired size distribution and are appropriately percolated by the pigment. In some examples, the charge adjuvant is added to the toner during grinding. In some other examples, the charge adjuvant is not added during grinding but is added after the toner has been produced and already contains the charge director. In some embodiments, the charge adjuvant is 2-(4-chlorophenyl)-3-methylbutyric acid.

Following grinding, the liquid composition is allowed to cool to at room temperature, and a charge director is added and mixed to percolate the charge director through the toner. In some examples, the charge director includes OLOA®1200. The composition is then left to sit for a sufficient period for the charge director to charge the particles. In some examples, the resulting composition contains a concentration of non-volatile solids comprised between 2 and 45 wt % and is diluted with additional quantities of carrier liquid as may be needed for storage or printing. For storage, the composition may be diluted to about 20% by weight of non-volatile solids (NVS). In some examples, immediately prior to use, the concentrate is may be diluted with additional carrier liquid to a concentration of about 0.1% to about 7% by weight of NVS.

In some embodiments, the ink composition has weight percentage of non-volatile substances that is between about 1% and about 45% of total weight of ink composition. In some other embodiments, the ink composition has weight percentage of non-volatile substances that is between about 5% and about 25% of total weight of ink composition. In some embodiments, the ink toner has a viscosity of about 1 to 1000 cps, depending of ink particle morphology, additive concentration, the percentage of non-volatile-substances (NVS), and other options. The viscosity of the ink toner can be modified by changing the concentration of the charge adjuvant added to the ink toner. The viscosity change takes place while maintaining the original ink morphology. This can be provided fixing qualities, usually obtainable, from higher viscosity inks to low viscosity inks. In some examples, the ink composition has a viscosity which is below 50.0 cps, when measured at 25° C., and has, at least, 10 wt % of total weight of ink composition of non volatile substances (NVS).

As used herein, the percentage of non-volatile substances (% NVS) represents the percentage of solid ingredient present in the formulation. In other word, it represents the total amount of solid ingredients and/or components that remain in the composition once the volatile substance is evaporated, in this specific case when the carrier liquid is evaporated. In some examples, the non-volatile substances (NVS) include the pigment-loaded, resin particles, the charge adjuvant and the charge director.

In some embodiments, the ink composition has a low field conductivity of about 0.1 to 300 or about 1 to 100 pmho/cm (or pS/cm). The low field conductivity of the ink composition can be modified by changing the concentration of the charge adjuvant added to the ink. In some other embodiments, the ink composition has a high field conductivity of about 10 to 500 pmho/cm (or pS/cm). The high field conductivity of the ink composition can be modified by changing the concentration of the charge adjuvant added to the ink or/and the charge director concentration.

In some embodiments, the ink composition can also contain others additives such as a surface modifier, compatibility additives, a viscosity control agent media additives, fixing additives and other additives. In yet some embodiments, a viscosity control agent assists in maintaining viscosity of starting materials combined in a resin grinding and pigment dispersion process to adequately reduce particle size. During the processing, depending on physical properties of the resin and pigment and the operating conditions for grinding, pigment may become encapsulated by resin when loading it on the resin, though encapsulation is not required. A viscosity control agent may be selected that, after grinding, functions as a charge adjuvant.

The inks disclosed herein are suitable for use in a variety of applications, including display applications, electronic skins, blanket jetting applications, digital printing applications, ion-beam printing applications, or other printing applications. The positive charging of the ink provides the possibility to develop a positive electrophoretic image in current press mode and is also well adapted for use in a dual color development display as well as in ion beam development technique.

In some examples, the ink of the present disclosure is used as a positively charged liquid toner in electrophotographic printing process. In such printing process, a digital printer forms a latent image on a photosensitive imaging plate that is then developed by applying the ink of the present disclosure to said photosensitive surface. The ink composition can then be transferred from the photosensitive imaging plate to an intermediate transfer member. In an ultimate step, the ink toner of the present disclosure is transferred to the substrate in view of printing the desired image. As another example, the ink composition is used in a method of forming printed image on supporting substrates. More precisely, as another example, the ink composition of the present disclosure is used in a method for developing electrostatic latent image. Such method includes forming an electrostatic latent image on a photo-responsive device, contacting the resulting image with the ink composition of the present disclosure and transferring the image to a suitable substrate, and permanently fixing the image thereto.

In some examples, the ink of the present disclosure is used as electronic inks. In some other examples, the ink is used as positively charged electronic inks for display applications such as e-skin and/or e-paper. The positively charged electronic ink is applicable for dual color (binary charged) displaying applications towards full color e-paper. Among the wide variety of known electronic displays, some involve electronically controlling the location of charged particles suspended in a fluid. Electrophoretic displays represent one type of electronic display and involve moving the charged particles suspended in the fluid with a Coulombic force exerted on the particles by an applied electrical signal. Some electronic displays are referred to as electronic paper or e-paper, since they can be thin and flexible with paper-like image quality. Electronic displays may use transmitted light, but some use only reflected light. As an example, electronic inks include charged particles, such as colorant particles, in order to help particles to respond to an electric field and to rearrange within the viewing area of the display to produce desired images. In some examples, the inks disclosed herein have relatively high zeta potentials (i.e., greater than or equal to +20 mV), and thus are particularly suitable for electronic display applications (such as, for example, electro-optical displays). Such electro-optical displays include those that are driven by electrophoresis and/or electro-convective flow.

In some embodiments, the ink of the present disclosure is used as electronic ink in a pixel of an electronic display. As an example, the electronic display includes a pixel, an electrode in the pixel, and electronic ink in the pixel wherein the ink contains charged particles that include a combination of carrier liquid, a basic pigment-loaded resin particle, a charge director and an acidic charge adjuvant.

In some examples, the average particle size of the basic pigment-loaded resin particles of the ink contained in the pixel is less than 2.0 micrometer; in some other examples, less than 1.0 micrometer. A dispersing agent may be provided, enhancing particle mobility. Various types and configurations of electrodes known to those of ordinary skill may be used, including bare electrodes contacting the ink and/or electrodes coated so as not to contact the ink.

In other embodiments, an image displaying method includes providing an electronic display including a pixel allowing visible light to enter and exit the pixel, an electrode in the pixel, and electronic ink in the pixel wherein the ink contains charged particles that include a combination of carrier liquid, a basic pigment-loaded resin particles, a charge director and an acidic charge adjuvant. The method includes applying an electrical signal to the pixel using the electrode and compacting the charged particles using the electrical signal. The electrical signal is changed and the charged particles are dispersed across the pixel. By way of examples, the method may include repeatedly compacting and dispersing during at least 10 signal application cycles without substantial degradation of the charged particles. Practically, the cycling may occur millions of times in an electronic display. In some other examples, the inks of the present disclosure can also be used in displays with in-plane shutter architectures, where the colorant particles are moved laterally into and out of a field of view in a pixel or sub-pixel display cell. Embodiments of the electronic inks are particularly suitable for this type of display, which tends to produce brighter and more colorful images than other displays.

The following examples illustrate the embodiments of the disclosure that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The claims are intended to cover such modifications and arrangements. Thus, while the present invention has been described above with particularity, the following examples provide further details in connection with what are presently deemed to be the most practical and preferred embodiments of the disclosure.

EXAMPLE 1

Procedure for Making the Ink

Sample 1:

Antaron®WP-660 wax resin is used. Antaron®WP-660 (WP-660) wax resin has a molecular weight of 3,000 to 4,500 and a melting point of 58-68° C. The WP-660 resin is put in a batch grinding mill along with: CL2 as charge adjuvant, Yellow pigments (Paliotol® yellow D1155) and Solvent-L® as liquid carrier. The mixture is grinded in an S0 attritor (from Union process) for 20 hours at 250 rpm. The formulation in the mill contains 51 parts of resin, 4 parts of charge adjuvant and 45 parts of pigment, on a solid weight basis, in enough Solvent-L® to provide 18 wt % NVS during grinding. Pigment loading is of 45 wt %. After grinding for at least 6 hours at 35° C., the resulting dispersion exhibit a particle size distribution with an average of 0.7 μm and a maximum of 1.2 μm as determined using a Mastersizer® 2000 particle analyzer.

Sample 2:

The same method as described in sample 1 is followed except that formulation in the mill does not contain charge adjuvant. The ink formulation contains thus 55 parts of wax resin Antaron®WP-660 (WP-660) and 45 parts of yellow pigment. The pigment loading is 45 wt %. A scanning electron microscope (SEM) photo shows a block structure for the particles and an average particle size of 0.75 μm (and a cutoff of 1.2 μm).

Sample 3:

The same method as described in sample 1 is followed except that the ink formulation contains CL1 as charge adjuvant. The formulation in the mill contains thus 51 parts of wax resin Antaron®WP-660 (WP-660), 4 parts of charge adjuvant CL1 and 45 parts of pigment, on a solid weight basis, in enough Solvent-L® to provide 18 wt % NVS during grinding.

Sample 4:

The same method as described in sample 1 is followed except that the ink formulation contains AC-575 (Alcyn®575) wax resin instead of WP-660 resin. Alcyn®575 (AC-575) resin exhibits a molecular weight of 1,000 to 3,000, a melting point of 106° C. by Mettler drop technique (ASTM D-3954), and a saponification number of 34 mg KOH/g. The formulation in the mill contains thus 51 parts of wax resin, 4 parts of charge adjuvant CL2 and 45 parts of pigment, on a solid weight basis, in enough Solvent-L® to provide 18 wt % NVS during grinding.

Sample 5:

The same method as described in sample 4 is followed except that ink formulation contains CL1 as charge adjuvant. The formulation in the mill contains thus 51 parts of wax resin AC-575, 4 parts of charge adjuvant CL1 and 45 parts of pigment, on a solid weight basis, in enough Sol-L to provide 18 wt % NVS during grinding.

Formulations and ratio of samples 1 to 5 are illustrated in TABLE (a) below.

TABLE (a)

| Samples | 1 | 2 | 3 | 4 | 5 |
|---|---|---|---|---|---|
| Resin | 51% WP-660 | 55% WP-660 | 51% WP-660 | 51% AC-575 | 51% AC-575 |
| Pigment | 45% Yellow | 45% Yellow | 45% Yellow | 45% Yellow | 45% Yellow |
| Charge adjuvant | 4% CL2 | — | 4% CL1 | 4% CL2 | 4% CL1 |
| Carrier liquid | Sol-L | Sol-L | Sol-L | Sol-L | Sol-L |
| Pigment loading (%) | 45 | 45 | 45 | 45 | 45 |
| Percentage NVS | 18% | 18% | 18% | 18% | 18% |
| average particle size | 0.7 | 0.75 | 0.65 | 0.66 | 0.65 |
| maximum size (μm) | 1.2 | 1.2 | 1.2 | 1.7 | 1.5 |

Charging and Conductivity Data

For each of the exemplary ink samples 1 to 5, 100 mg/g solids of charge director (OLOA®1200) is added. The resulting compositions are mixed in a shaker to yield initial low field conductivity of 80 pS (as measured in a Q/m test cell). The inks are then allowed to sit for a charging period (12 hours) during which charges accumulate on ink particles and are stabilized. The inks are subsequently diluted with Solvent-L® to a Non Volatile Solvent (NVS) concentrate of about 2% w/w. Particles conductivity (PC) of the diluted sample inks are then evaluated in Q/m test cells. The particle's conductivity is expressed in pS (1 pS/cm=1 pmho/cm). The results are illustrated in TABLE (b) below and in FIG. 1. FIG. 1 is a graph representation of the measured particle conductivities (PC in pS) for ink compositions 1 to 5 (comprising CL1, CL2 or without any charge adjuvant and comprising AC-575 or WP660 resins), charged with OLOA®1200.

TABLE (b)

| Samples | 1 | 2 | 3 | 4 | 5 |
|---|---|---|---|---|---|
| Conductivity (in pS/cm) | 27 | 3 | 0 | −9 | −5 |

EXAMPLE 2

Ink samples A to H are prepared as described in example 1. Different resins and charge adjuvants are used. TABLE (c) reflects the different ink formulations of samples A to H.

TABLE (c)

| Samples | A | B | C | D | E | F | G | H |
|---|---|---|---|---|---|---|---|---|
| Resin | 55% WP-660 | 55% AC-575 | 51% WP-660 | 51% AC-575 | 51% WP-660 | 51% AC-575 | 51% WP-660 | Resin VCA |

TABLE (c)-continued

| Samples | A | B | C | D | E | F | G | H |
|---|---|---|---|---|---|---|---|---|
| Pigment | 45% Yellow | 45% Yellow | 45% Yellow | 45% Yellow | 45% Yellow | 45% Yellow | 45% Yellow | 45% Yellow |
| Charge adjuvant | — | — | 4% CL1 | 4% CL1 | 4% CL2 | 4% CL2 | 4% ZZ11 | stearate/palmitate |
| Carrier liquid | Sol-L | Sol-L | Sol-L | Sol-L | Sol-L | Sol-L | Sol-L | Sol-L |
| Percentage NVS (%) | 18% | 18% | 18% | 18% | 18% | 18% | 18% | 18% |

For each of the exemplary ink samples (A to H), a solution of 10 w/w % of charge director ZZ11 (Zirconium 2-ethyl hexanoate) is added. The resulting compositions are mixed in a shaker to yield initial low field conductivity of 80 pS in the Q/m test cell. The inks are then allowed to sit for a charging period (12 hours) during which charges accumulate on the ink particles. The inks are subsequently diluted with Isopar-L® to a Non Volatile Solvent concentrate of about 2 w/w %. A 2% NVS dispersion of each of the ink samples are charged with the above charge director solution by 100 mg/g level. Particles conductivity (PC) of the diluted samples is evaluated in the Q/m test cell. The high field conductivity is measured in Q/M cell while the low field conductivity is measured in a Z-electrodes stick meter device. The particle's conductivity is expressed in pS. LFC is Low Field Conductivity. HFC is high field conductivity. DC is direct conductivity and denotes residual direct conductivity. PC (particles charge) is defined as the difference between high field and low field conductivities.

Figure 2:
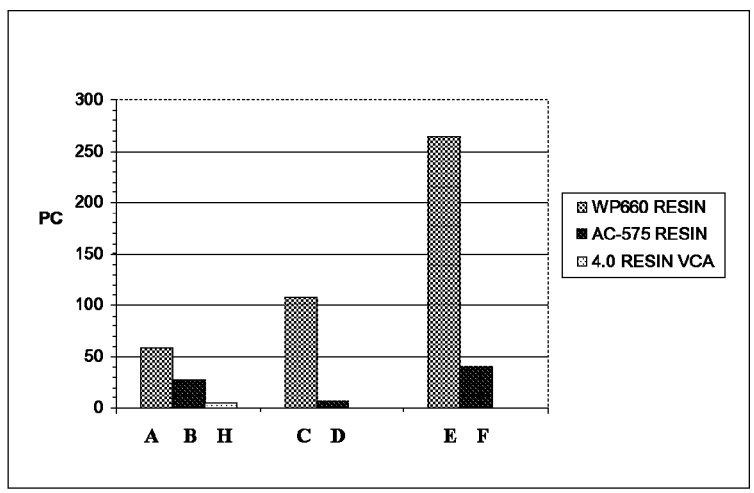

The results of the particle conductivity, charged with ZZ11, are illustrated in FIG. 2 and in TABLE (d). FIG. 2 shows a graph representing the measured particle conductivities (PC) for ink compositions A to H charged with ZZ11.

EXAMPLE 3

Figure 3A:
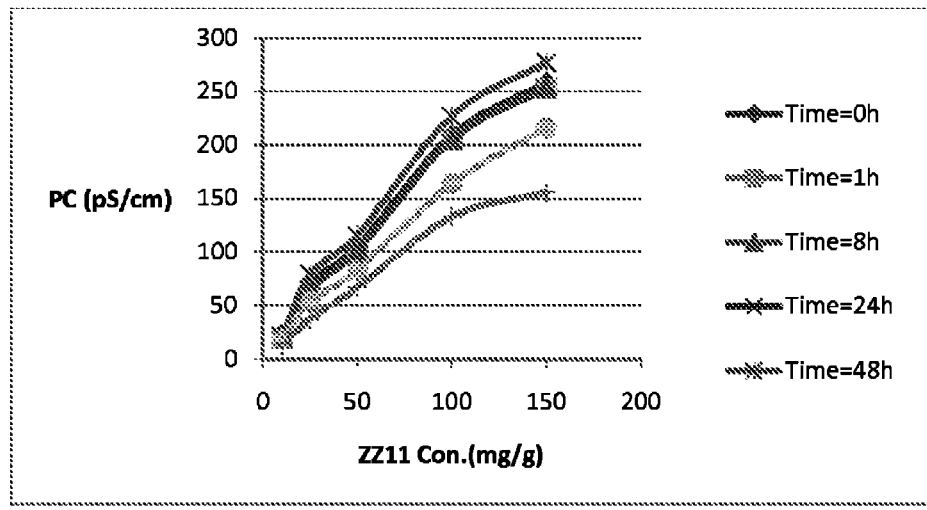
FIG. 3A is a graph representing measured particle conductivities of example ink compositions, in relation with charge director concentration, at different kinetic states.
Figure 3B:
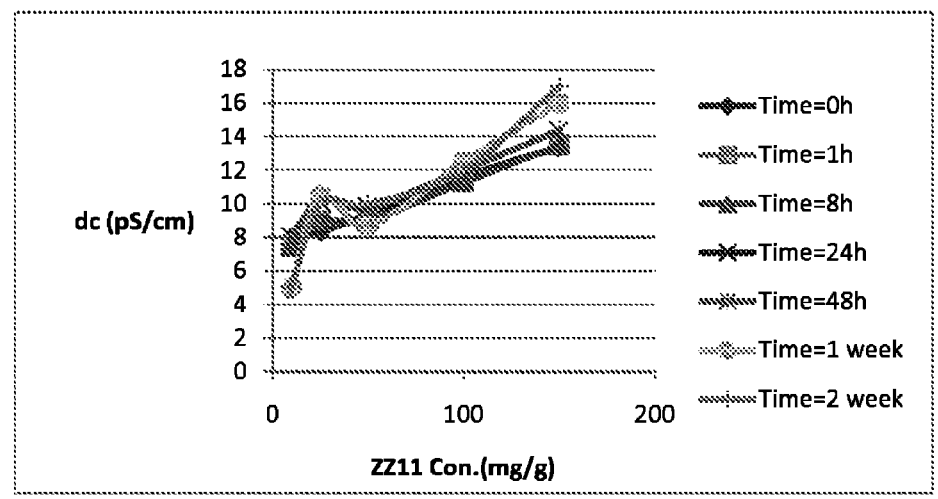
FIG. 3B is a graph representing direct current conductivity (DC) of example ink compositions, in relation with charge director concentration, at different kinetic states.

Particle conductivity (PC) and direct conductivity (DC) are evaluated as a function of the concentration of the charge director ZZ1 at different kinetic states. The kinetics of this system is measured in short and long time scale up to 2 weeks. The results are illustrated in FIGS. 3A and 3B. FIG. 3A shows a graph of the measured particle conductivities (PC) for the yellow ink composition E charged with different concentrations of ZZ11, at different kinetic states. FIG. 3B shows a graph of the measured Direct current conductivity (dc) for the yellow ink composition E charged with different concentrations of ZZ11, at different kinetic states. The conductivity of the particle is dependant of the concentration of the charging director (ZZ11).

EXAMPLE 4

Figure 4:
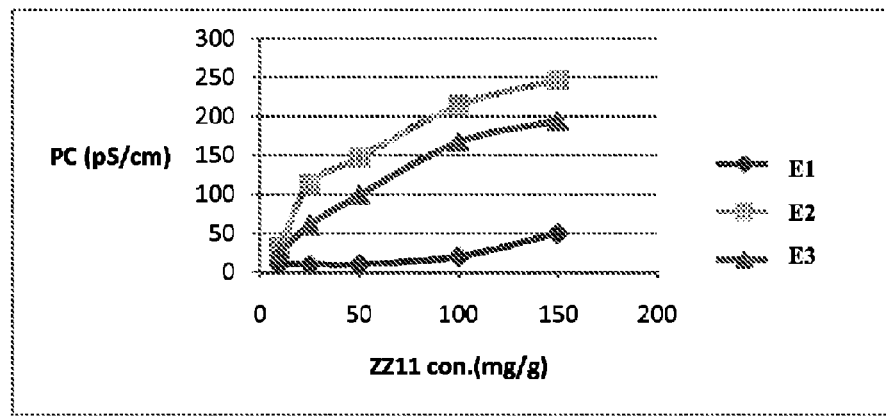
FIG. 4 is a graph representing measured particle conductivities of example ink compositions, in relation with charge director concentration, at different charge adjuvant concentrations.

The particle conductivity of ink formulations E1, E2 and E3, containing different amounts of charge adjuvant CL2 as illustrated in TABLE (e) below, are tested. The results are illustrated in FIG. 4. FIG. 4 shows a graph of the measured particle conductivities (PC) for ink compositions E1, E2 and E3, as function of the charge adjuvant (ZZ11) concentration (ranging from 0 to about 150 mg/gram 24 h after charging).

TABLE (d)

| Sample | Charging system | Charging kinetic (h) | HFC (pS/cm) | LFC (pS/cm) | DC (pS/cm) | PC (pS/cm) |
|---|---|---|---|---|---|---|
| A | Resin | | | | | |
| | Resin - WP 660 | 0 | 5 | | 0.2 | |
| | Charge director - ZZ11 | 48 | 96 | 38 | 46.7 | 58 |
| B | Resin - Aclyn 575 | 18 | 27 | | 0.3 | |
| | Charge director - ZZ11 | 48 | 19 | 0 | 0.2 | 19 |
| C | Charge adjuvant | | | | | |
| | Resin - WP 660 | 18 | 162 | | 10 | |
| | Charge adjuvant - CL1 | | | | | |
| | Charge director - ZZ11 | 48 | 139 | 32 | 9.9 | 107 |
| D | Resin - Aclyn 575 | 18 | 22 | | 0.3 | |
| | Charge adjuvant - CL1 | | | | | |
| | Charge director - ZZ11 | 48 | 6 | 0 | 0.2 | 6 |
| E | Resin - WP 660 | 0 | 28.55 | | 0.75 | |
| | Charge adjuvant -CL2 | | | | | |
| | Charge director - ZZ11 | 48 | 330.7 | 67 | 13.5 | 264 |
| F | Resin - Aclyn 575 | 18 | 39 | | 0.3 | |
| | Charge adjuvant -CL2 | | | | | |
| | Charge director - ZZ11 | 48 | 40 | 0 | 2.7 | 40 |
| G | Resin - WP 660 | 0 | 22 | | 3.2 | |
| | Charge adjuvant -ZZ11 | | | | | |
| | Charge director - ZZ11 | 48 | 139 | 50 | 12.15 | 89 |
| H | Resin/charge adjuvant | | | | | |
| | Resin VCA | | 6 | 0 | 0.15 | 6 |
| | Charge adjuvant- Al stearate/palmitate | | | | | |
| | Charge director - ZZ11 | | | | | |

The result demonstrates that charge adjuvant concentration has an effect on the conductivity.

TABLE (e)

| Samples | E1 | E2 | E3 |
|---|---|---|---|
| Resin WP-660 | 51% | 51% | 46% |
| Yellow Pigment | 45% | 45% | 45% |
| Charge adjuvant CL2 | 0% | 4% | 8% |

EXAMPLE 5

Figure 5:
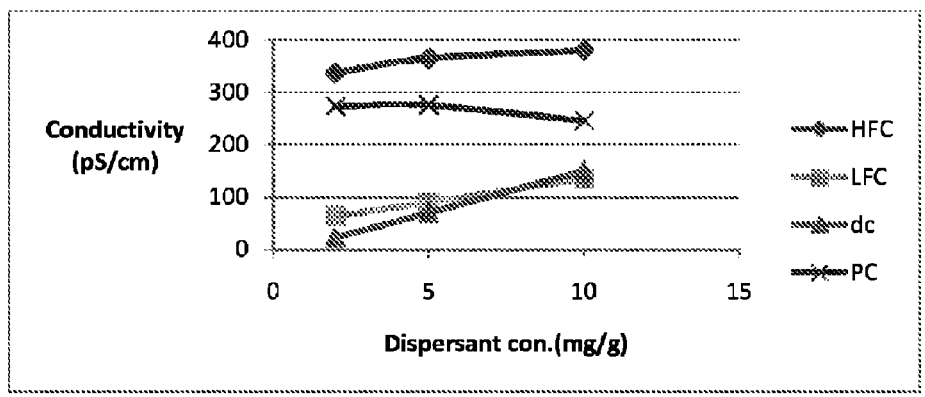
FIG. 5 is a graph representing measured conductivities (PC, HFC, LFC, Dc and PC) of example ink compositions, in relation with dispersant concentrations.

The particles conductivities of ink formula E are tested with formulation containing different amounts of Solsperse®11200. The results are illustrated in FIG. 5. FIG. 5 shows a graph of the measured conductivities (PC, HFC, LFC, Dc and PC) for ink composition E (charged with ZZ11, at 100 mg/g) for different concentrations of dispersant (2.5, 5 and 10 mg/g of Solsperse®11200). Measurements are made during 24 hours. The results demonstrate that addition of dispersants does not influence significantly conductivities of ink compositions.

EXAMPLE 6

Figure 6:
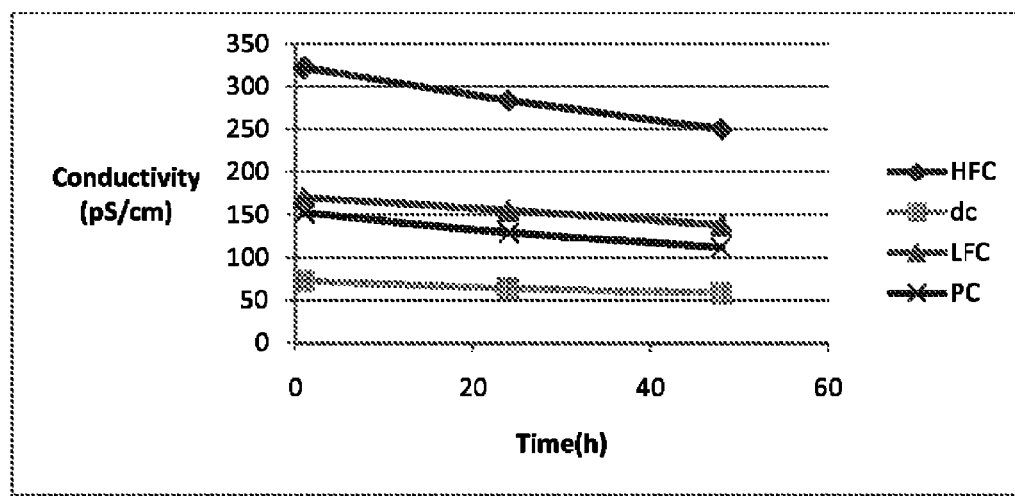
FIG. 6 is a graph representing measured conductivities (PC, HFC, LFC, Dc and PC) for example ink composition containing black pigment during 48 hours.

Antaron®WP-660 wax resin is put in an S-0 Attritor (made by Union Process) batch grinding mill along with CL2, black and blue pigments (Mon-800® and Reflex®blue-d6200) and Solvent-L®. The formulation contains 51 parts of wax resin, 4 parts of charge adjuvant and 45 parts of pigment, on a solid weight basis, in enough Solvent-L® to provide 18 wt % NVS during grinding. Pigment loading is 45 wt %. The grinding is carried overnight at 35° C. The charging of the resulting ink is done with ZZ11 (Zirconium 2-ethyl hexanoate) at a level of 100 mg/g (as to solid content) and its kinetic is recorded for the next 48 hours. The results are illustrated in FIG. 6. FIG. 6 shows a graph of the measured conductivities (PC, HFC, LFC, Dc and PC) for ink composition containing black and blue pigments (charged with ZZ11 100 mg/g) during 48 hours.

Definition of Ingredients Used in the Examples
Antaron®WP-660 (WP 660) is a resin available from International Specialty Products.
Alcyn®575 wax (AC-575) is a resin available from Honeywell Inc.
Resin VCA is Nucrel-960®, a polyethylene methacrylic acid copolymer from DuPont.
Paliotol® yellow D1155 is a pigment available from BASF Corp.
CL1 is 4-(2,4-dichlorophenoxy)butyric acid, available from Sigma Aldrich.
CL2 is 2-(4-chlorophenyl)-3-methylbutyric acid, available from Sigma Aldrich.
ZZ11 is zirconium(IV) 2-ethyl hexanoate available from Alfa Aesar.
OLOA®1200 is polyisobutylene succinimide polyamine, available from Chevron Oronite.
Isopar-L® is a carrier liquid available from Exxon Corporation.
Solvent-L® (Sol-L) is a liquid carrier available from Idemitsu Petrochemical Corp.
Stearate/palmitate is charge adjuvant (aluminum di/tri stearate/palmitate salt).
Mon-800® is a pigment available from Cabot-BASF.
Reflex®blue-d6200 is a pigment available from BASF.
Solsperse®11200 is a dispersant available from Lubrizol.

The preceding description has been presented only to illustrate and describe exemplary embodiments of the present disclosure. Although certain example compositions, methods and apparatus have been described herein, the scope of coverage of this patent is not limited thereto. On the contrary, this patent covers all compositions, methods and apparatus fairly falling within the scope of the claims either literally or under the doctrine of equivalents.

The invention claimed is:

1. A positively charged ink comprising a combination of:
   a. a carrier liquid,
   b. basic pigment-loaded resin particles, wherein the resin of the particle is a homopolymer or a copolymer of polyvinyl pyrrolidone
   c. a charge director,
   d. and an acidic charge adjuvant.

2. The positively charged ink according to claim 1 wherein the resin of the particle is a vinyl pyrrolidone/triacontene copolymer.

3. The positively charged ink according to claim 1 wherein the basic pigment-loaded resin particles exhibit an average particle size of less than 1.0 micron and contain a resin that exhibits a molecular weight of 500 to 20,000.

4. The positively charged ink according to claim 1 wherein the charge director is an organic multi-valent metal salt.

5. The positively charged ink according to claim 1 wherein the charge director is zirconium octoate or zirconium 2-ethyl hexanoate.

6. The positively charged ink according to claim 1 wherein the charge adjuvant has the formula $X_n(R^a)(R^b)(COOH)$ or $X_n(R^a)(R^b)$ wherein X is F, Cl, Br, $NO_2$ or CN; $R^a$ is a substituted or unsubstituted alkyl group; $R^b$ is Sb, P, Ti, Sn, B, Al, Zn, a phenol or a benzene group and wherein n is 1, 2, 3, 4 or 5.

7. The positively charged ink according to claim 1 wherein the charge adjuvant is present in an amount representing from about 1 to about 5 weight percent of the total amount of solids present in the ink composition.

8. The positively charged ink according to claim 1 wherein the charge adjuvant is 2-(4-chlorophenyl)-3-methylbutyric acid or 4-(2,4-dichlorophenoxy)butyric acid.

9. The positively charged ink according to claim 1 wherein the charge adjuvant is 2-(4-chlorophenyl)-3-methylbutyric acid and is present in an amount representing from about 3 to about 5 weight percent of the total amount of solids present in the ink composition.

10. The positively charged ink according to claim 1 wherein the resin is a vinyl pyrrolidone/triacontene copolymer and the charge adjuvant is 2-(4-chlorophenyl)-3-methylbutyric acid.

11. The positively charged ink according to claim 1 wherein the resin is a vinyl pyrrolidone/triacontene copolymer, the charge adjuvant is 2-(4-chlorophenyl)-3-methylbutyric acid and the charge director is zirconium 2-ethyl hexanoate.

12. A method of making a positively charged ink comprising:
   a) grinding a carrier liquid, a basic resin and a pigment to form a slurry, wherein the resin is a vinyl pyrrolidone/triacontene copolymer;
   b) mixing a charge adjuvant and a charge director in the slurry after grinding, wherein the charge adjuvant is 2-(4-chlorophenyl)-3-methylbutyric acid or 4-(2,4-dichlorophenoxy)butyric acid;
   c) and forming the ink.

13. An electronic display comprising:
a) a pixel;
b) an electrode in the pixel;
c) and an ink in the pixel, wherein the ink is a positively charged ink comprising a combination of a carrier liquid, basic pigment-loaded resin particles, a charge director, and an acidic charge adjuvant.

14. An image displaying method comprising:
a) providing an electronic display including a pixel allowing visible light to enter and exit the pixel, an electrode in the pixel, and electronic ink in the pixel, wherein the ink is a positively charged ink comprising a combination of a carrier liquid; basic pigment-loaded resin particles; a charge director and an acidic charge adjuvant;
b) applying an electrical signal to the pixel using the electrode and compacting the charged particles using the electrical signal;
c) and changing the electrical signal and dispersing the charged particles across the pixel.

* * * * *